US012313388B2

(12) United States Patent
Schmieg et al.

(10) Patent No.: US 12,313,388 B2
(45) Date of Patent: *May 27, 2025

(54) BIODEGRADABLE SHOTSHELL COMPONENTS

(71) Applicant: Federal Cartridge Company, Anoka, MN (US)

(72) Inventors: Alex R. Schmieg, Big Lake, MN (US); Robert A. Strange, Isanti, MN (US); Anthony C. Stockey, Hugo, MN (US); Steven P. Schommer, Isanti, MN (US); Adam J. Moser, Big Lake, MN (US)

(73) Assignee: Federal Cartridge Company, Anoka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,669

(22) Filed: Feb. 20, 2024

(65) Prior Publication Data
US 2024/0426586 A1 Dec. 26, 2024

Related U.S. Application Data

(63) Continuation of application No. 18/083,952, filed on Dec. 19, 2022, now Pat. No. 11,933,593, which is a continuation of application No. 17/482,348, filed on Sep. 22, 2021, now Pat. No. 11,543,219.

(51) Int. Cl.
*F42B 7/08* (2006.01)
*F42B 7/06* (2006.01)

(52) U.S. Cl.
CPC . *F42B 7/08* (2013.01); *F42B 7/06* (2013.01)

(58) Field of Classification Search
CPC .............. F42B 7/08; F42B 7/043; F42B 7/06
USPC ....... 102/466, 467, 449, 450, 451, 453, 454, 102/455, 457, 461
See application file for complete search history.

(56) References Cited

U.S. PATENT DOCUMENTS

| | | | | |
|---|---|---|---|---|
| 2,350,574 A * | 6/1944 | Tienken, Jr. | ............. | F42B 5/26 493/272 |
| 3,090,309 A * | 5/1963 | Burns, Jr. | ................. | F42B 7/12 102/444 |
| 5,471,931 A * | 12/1995 | Gardner | .................... | F42B 7/04 102/449 |
| 2018/0274890 A1 * | 9/2018 | Havens | .................... | C08L 67/04 |

* cited by examiner

*Primary Examiner* — John Cooper
(74) *Attorney, Agent, or Firm* — Christensen, Fonder, Dardi & Herbert PLLC; Timothy J. Busse (57) ABSTRACT

Devices and methods for shotshell cartridges, particularly shotshell cartridges with biodegradable components. One or more of the casing, shot wad, spacer, and powder wad may be formed of biodegradable materials. A biodegradable shot wad is manufactured of cellulosic fibers and wax to provide obturation and gas seal properties at high pressures with high reliability.

20 Claims, 4 Drawing Sheets

BIODEGRADABLE SHOTSHELL COMPONENTS

CROSS REFERENCE TO RELATED APPLICATION

This application is a continuation of U.S. patent application Ser. No. 18/083,952 filed Dec. 19, 2022 which is a continuation of U.S. patent application Ser. No. 17/482,348 filed Sep. 22, 2021, now U.S. Pat. No. 11,543,219, the entire contents of which are incorporated herein by reference.

FIELD OF THE INVENTION

The present invention is directed to shotgun shells and components of shotgun shells.

BACKGROUND OF THE INVENTION

After firing, various remnants of a shotgun cartridge are discarded or dropped to the ground. Conventional arrangements and materials meet ballistics and reliability requirements, but are not biodegradable.

SUMMARY OF THE INVENTION

A feature and benefit of embodiments is a shotshell cartridge comprising a casing, a paperboard shot wad positioned in the casing, a spacer comprising corn byproduct, a fiber wad, a propellant, and shot. The casing comprises a head portion, an inner diameter, and a primer. The shot wad is positioned in the casing, the shot wad comprising a rearward portion, a forward portion comprising a forward rim, and at least one axially-extending slit extending rearwardly from the forward rim and terminating at a length of at least 75% of the paperboard shot wad. The spacer comprises corn byproduct, and the spacer is located within the rearward portion of the shot wad. The fiber powder wad is located inside the casing and rearward of the shot wad, comprising an annular depression formed in a rearward-facing axial end of the fiber powder wad, and a ring located radially outward from the annular depression, both the annular depression and the ring proximate to the outer radial surface of the fiber powder wad, the fiber powder wad comprising a cylindrical shape and having a width of substantially the inner diameter of the casing, the fiber powder wad formed of a fiber material comprising: 40% or more by weight of a cellulosic fiber, a first wax comprising paraffin, and a second wax comprising soy and further comprising a melting point of at least 140° F. At least one of the first wax and the second wax is substantially evenly distributed throughout the volume of the cellulosic fiber. Before applying the second wax comprising soy, the fiber material comprises at least 94% cellulose by weight, at least 1% paraffin wax by weight, a density of at least 25 lb/ft³, and a surface tensile strength of between 450 psi to 700 psi. The propellant is in the casing rearward of the fiber powder wad. The shot substantially fills the volume located between the spacer and the forward rim of the shot wad. The ring of the fiber powder wad is configured to obturate and form a gas seal with a gun barrel upon firing the shotshell cartridge. The ring of the fiber powder wad is configured to dislocate from the fiber powder wad after the propellant is ignited and before the fiber powder wad leaves a gun barrel.

A feature and benefit of embodiments is a shotshell cartridge comprising a casing, a paperboard shot wad positioned in the casing, a spacer comprising corn byproduct, a fiber wad, a propellant, and shot. The casing comprises a head portion, an inner diameter, and a primer. The shot wad is positioned in the casing, the shot wad comprising a rearward portion, a forward portion comprising a forward rim, and at least one axially-extending slit extending rearwardly from the forward rim and terminating at a length of at least 75% of the paperboard shot wad. The spacer comprises corn byproduct, and the spacer is located within the rearward portion of the shot wad. The fiber powder wad is located inside the casing and rearward of the shot wad, comprising an annular depression formed in a rearward-facing axial end of the fiber powder wad, and a ring located radially outward from the annular depression, both the annular depression and the ring proximate to the outer radial surface of the fiber powder wad, the fiber powder wad comprising a cylindrical shape and having a width of substantially the inner diameter of the casing, the fiber powder wad formed of a fiber material comprising: 40% or more by weight of a cellulosic fiber, a first wax comprising paraffin, and a second wax comprising soy and further comprising a melting point of at least 140° F. At least one of the first wax and the second wax is substantially evenly distributed throughout the volume of the cellulosic fiber. The propellant is in the casing rearward of the fiber powder wad. The shot substantially fills the volume located between the spacer and the forward rim of the shot wad. The ring of the fiber powder wad is configured to obturate and form a gas seal with a gun barrel upon firing the shotshell cartridge. The ring of the fiber powder wad is configured to dislocate from the fiber powder wad after the propellant is ignited and before the fiber powder wad leaves a gun barrel.

In embodiments, each of the first wax and the second wax is substantially distributed throughout the volume of the cellulosic fiber of the fiber powder wad.

In embodiments, the second wax comprises hydrogenated soybean oil.

In embodiments, the annular depression comprising an axial depth of about 0.05-0.10 inches, an inner diameter of about 0.40-0.55 inches, and an outer diameter of about 0.55-0.65 inches.

In embodiments, a second annular depression is at an opposite axial end of the fiber powder wad, and a second ring is located radially outward from the second annular depression.

In embodiments, the ring of the fiber wad defines a width in the radial direction of about 0.02-0.10 inches from an outer diameter of the annular depression to a radially outer surface of the fiber powder wad.

In embodiments, the cartridge comprises only one fiber powder wad, the fiber powder wad being a unitary part.

In embodiments, the spacer consists essentially of corn cob.

In embodiments, the spacer comprises corn cob byproduct and one or more additional biodegradable materials.

In embodiments, the shot wad does not comprise wax.

In embodiments, the shot wad defines an axial length, the spacer defines an axial length of about 30-50% of the axial length of the shot wad, and the fiber powder wad defines an axial length of about 30-50% of the axial length of the shot wad.

In embodiments, the casing is a 12-gauge casing, and the axial length of the shot wad comprises about 1.1 inches.

In embodiments, the spacer and the fiber powder wad each defining an axial length, the axial length of the fiber powder wad being about 90-110% of the axial length of the spacer.

In embodiments, the casing is formed of biodegradable materials.

In embodiments, the casing is a 12-gauge casing, and the ring of the fiber powder wad is configured to obturate to provide a chamber pressure of at least 9,000 psi.

In embodiments, the fiber powder wad is configured to, upon firing, travel further than the shot wad.

A feature and benefit of embodiments is method of manufacturing a powder wad for shotshell, comprising: bonding cellulosic fibers to form a board, the bonding comprising: emulsifying a first wax and water to form a wax emulsion, the first wax comprising a paraffin wax, separating the first wax from the wax emulsion by adding aluminum sulfate to the wax emulsion, depositing the first wax onto the cellulosic fibers, forming a board from the cellulosic fibers and first wax, and drying the board, wherein during the drying stage, the first wax is melted and substantially uniformly distributed throughout the board, wherein upon drying the board, the board comprises at least 94% cellulose by weight, at least 1% paraffin wax by weight, a density of at least 25 lb/ft$^3$, and a surface tensile strength of between 450 psi to 700 psi; cutting a cylindrical puck from the board; placing the cylindrical puck in a container; heating a second wax in a tank to a set point temperature in a range of about 175-225° F., wherein the second wax comprises a soy wax comprising a melting point of at least 150° F.; dipping the container in the tank for a dipping time period of at least 30 seconds to apply the second wax to the puck while maintaining the second wax at the set point temperature, whereby the second wax is absorbed through at least 90% of the volume of the puck; cooling the puck for a cooling time period, wherein the second wax is solidified after the cooling time period; and pressing a pair of opposed presses against both axial ends of the puck to form an annular depression at both axial ends, whereby a ring is formed radially outwardly from the annular depression.

In embodiments, the cutting comprises cutting a plurality of pucks from the board, and the placing comprises placing the plurality of pucks into a basket and covering the basket.

In embodiments, the set point temperature is configured to be at least 10° F. above the melting point of the second wax.

In embodiments, the pressing is performed at 750-4000 psi and the pair of opposed presses encapsulate the puck to prevent radial expansion of the puck.

In embodiments, the pressing forms each annular depression to an axial depth of about 0.05-0.1 inches and an inner diameter of about 0.40-0.55 inches.

In embodiments, the tank is not pressurized above ambient pressure.

In embodiments, the cooling time period is about 12-24 hours.

In embodiments, the second wax is absorbed through substantially the entire volume of the puck.

In embodiments, upon heating the second wax in the tank to the set point temperature, the soy wax has a viscosity within approximately 10% of water.

In embodiments, forming comprises forming a slurry with the wax emulsion and the cellulosic fibers, and pressing the slurry into a board.

The above summary of the various representative embodiments of the invention is not intended to describe each illustrated embodiment or every implementation of the invention. Rather, the embodiments are chosen and described so that others skilled in the art can appreciate and understand the principles and practices of the invention. The Figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, because of overlapping nomenclature in some terms, the following definitions are applicable throughout the specification and claims. The term "cellulosic biomass" means material that is plant based and includes, as non-limiting examples, corn byproduct, wood pulp, wood byproduct, paper products (e.g., cardboard), cellulose fiber, and the like. The term "corn byproduct" means any material derived from the corn plant including the stem, leaves, husk, cob, kernels, and cornmeal; corn byproduct may be in any form including ground or crushed. The term "biodegradable" refers to products that are formed of one or more materials capable of being broken down or decomposed by natural processes, bacteria, or other organisms. The term "substantially biodegradable" refers to products formed of 90% or more by weight of biodegradable material.

Cartridge and Casing

Figure 1:
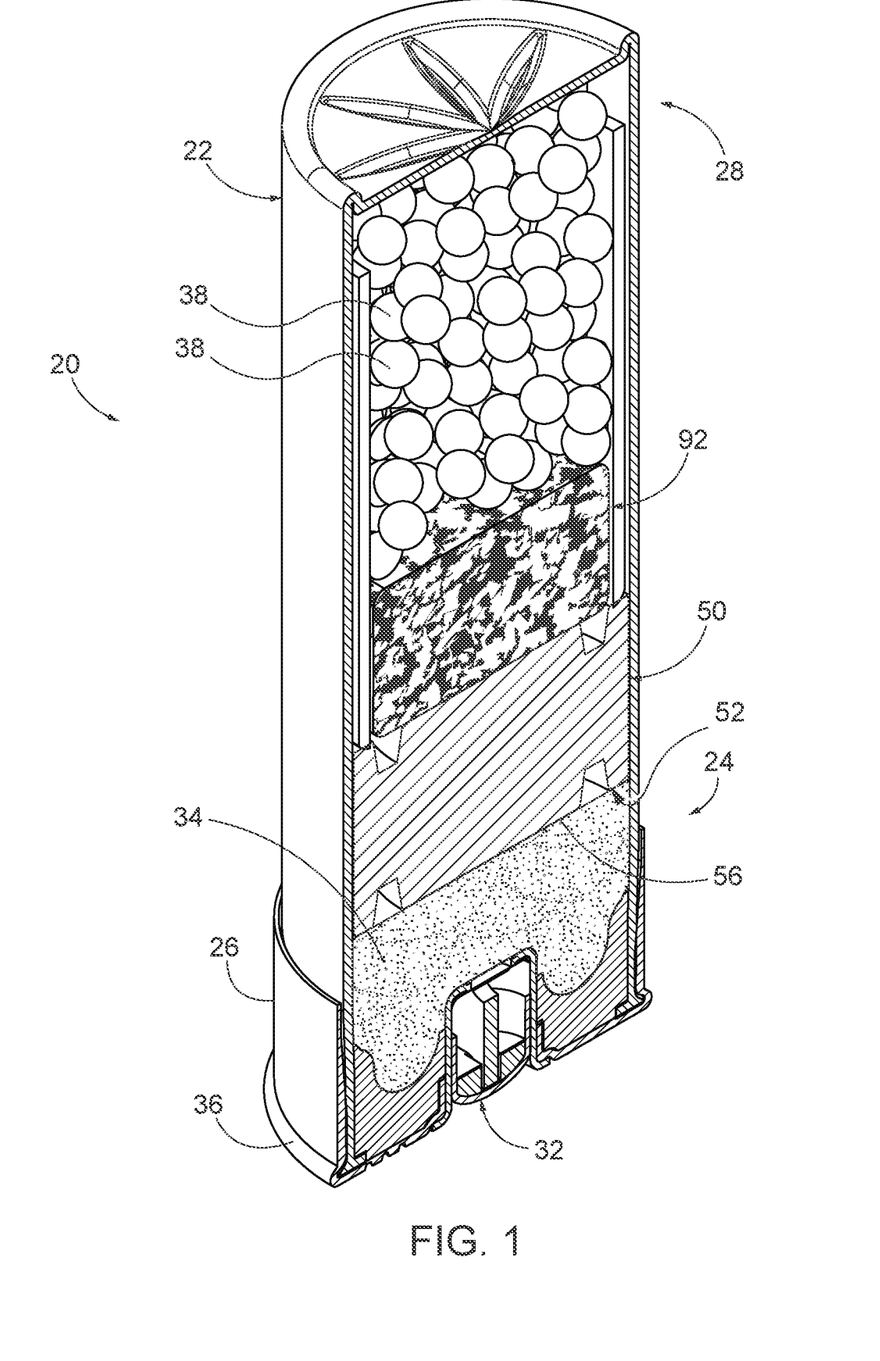
FIG. 1 is perspective view of a sectioned view of an example shotgun cartridge in accord with embodiments of the present disclosure, with the cross-section taken across a diameter of the cartridge.
Figure 2:
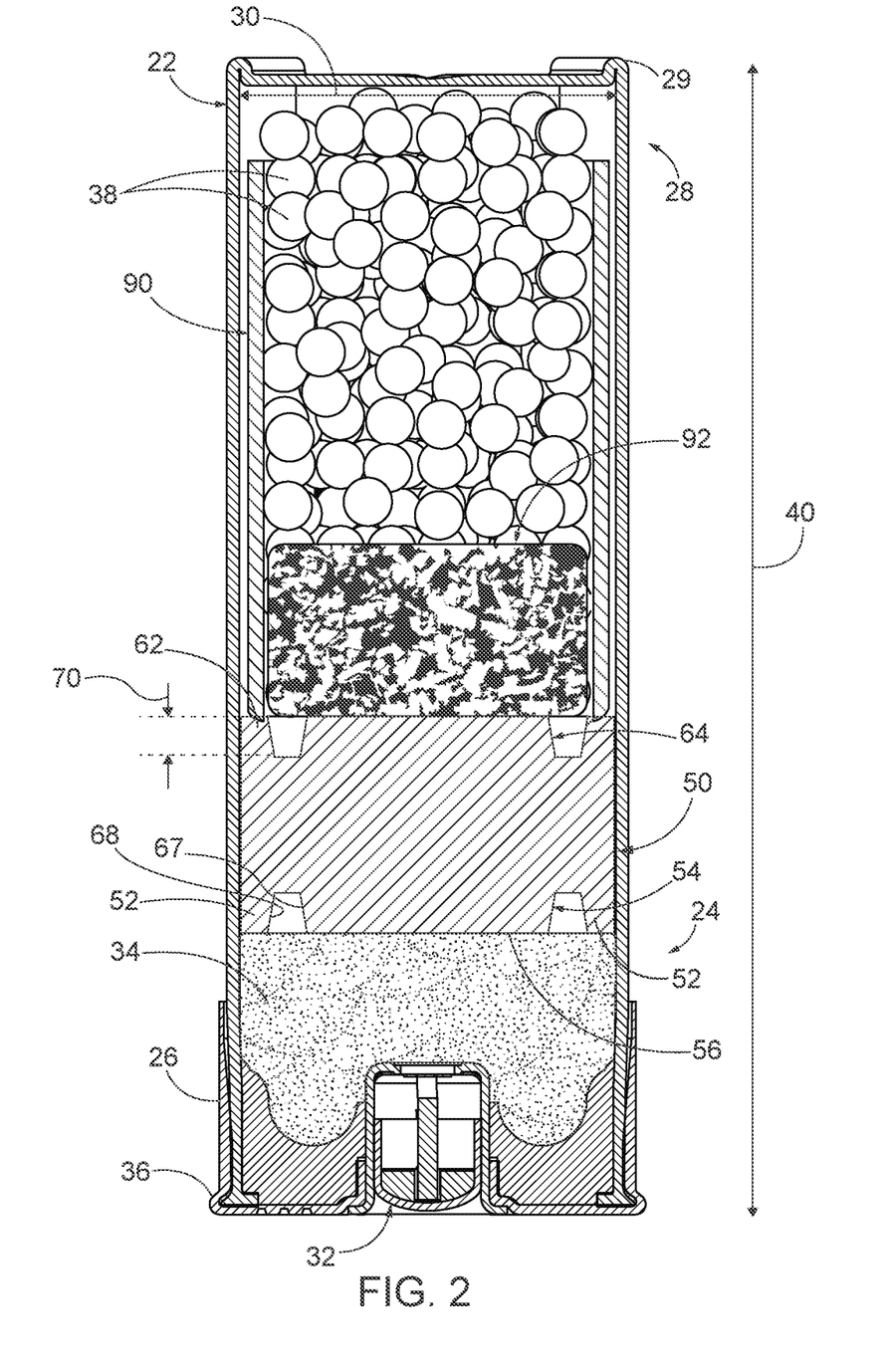
FIG. 2 is a front elevational view of the example shotgun cartridge of FIG. 1.

Referring to FIGS. 1 and 2, these figures show an embodiment of a shotshell cartridge 20 for a shotgun comprises a casing 22 having a rearward end 24 closed by a head portion 26 and opposite a forward end 28 closed by a crimp 29, an inner diameter 30 defining a chamber. The head portion 26 mounts a primer 32 and a propellant 34 (e.g., gunpowder) is mounted in the casing 22 forward of the primer 28. In embodiments, the head portion 26 comprises a rim 36. The forward end 28 of the casing 22 is loaded with shot 38, for example shot pellets of a desired size. In certain embodiments, the casing 22 may be formed of various materials including biodegradable materials (e.g., cardboard or paperboard) applicable to components discussed below. In other embodiments, the casing 22 may be formed of polymeric material with a head portion 26 formed of brass or other high-strength material. In embodiments, one or both of the casing 22 and the head portion 26 is both formed of biodegradable materials, and in certain embodiments the casing 22 and the head portion 26 are formed from the same material as a unitary part. In embodiments applicable to a 12-gauge shotgun, the cartridge 20 defines an overall length 40 of about 2.0 to 3.5 inches, and in some embodiments 2.2-2.5 inches, and in further embodiments about 2.34 inches.

In some embodiments, the shotshell cartridge 20 further comprises a fiber powder wad 50 in the casing 22 serving as an over-powder wad, a shot wad 90 containing the shot 38, and in some embodiments, a spacer 92 inside the shot wad 90 and between the shot 38 and the fiber powder wad 50. In some embodiments, the fiber powder wad 50 comprises a ring 52 that, upon firing of the shotgun to ignite the propellant 32, will obturate and form a gas seal with the gun barrel. In some embodiments, the ring 52 will dislocate and separate from the fiber powder wad 50 either before the fiber powder wad 50 leaves the gun barrel, when the fiber powder wad 50 leaves the gun barrel, or after the fiber powder wad 50 leaves the gun barrel and before the fiber powder wad falls to the ground.

Fiber Powder Wad

Figure 3:
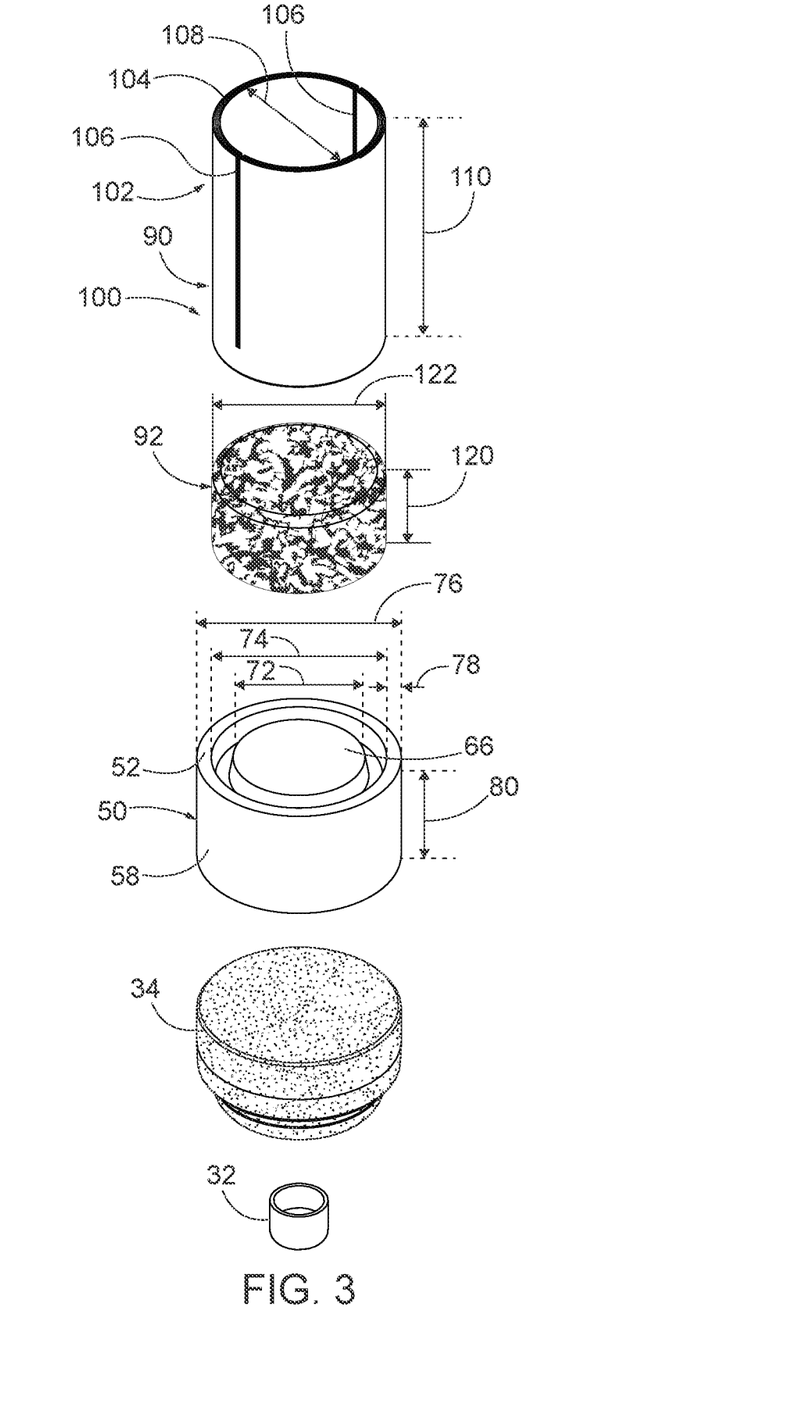
FIG. 3 is an exploded perspective view of certain interior components of the example shotgun cartridge of FIG. 1 with some components omitted for visualization.

Referring to FIGS. 2-3, in some embodiments, the fiber powder wad 50 is located inside the casing 22 forward of the propellant 32 and rearward of the shot wad 90. In some embodiments, the fiber powder wad 50 comprises an annular depression 54 that is formed in a rearward-facing axial end 56 of the fiber powder wad. A ring 52 is located radially outward from the annular depression 54. Both the annular depression 54 and the ring 52 are proximate to an outer radial surface 58 of the fiber powder wad 50. In embodiments, the fiber powder wad 50 additionally comprises a second ring 62 and annular depression 64 formed in a forward-facing axial end 66, such that the fiber powder wad 50 may be readily installed facing in either axial direction such that either ring 52 or 62 will be oriented rearwardly and configured to obturate upon firing. The fiber powder wad 50 has a cylindrical shape in the illustrated embodiment. In some embodiments, the annular depression 54, 64 has an inner wall 67 and an outer wall 68 that are angled or parallel to the axial direction. In embodiments, the inner wall 67 is angled inwardly by about 10-30 degrees and the outer wall 68 is angled outwardly by about 10-30 degrees, and in certain embodiments are angled by about 20 degrees. In some embodiments, the cartridge 20 includes only one fiber powder wad 50. In certain embodiments, the fiber powder wad 50 is a unitary or one-piece part formed of the same material.

In some embodiments, the fiber powder wad 50 is formed of a cellulosic biomass and, in certain embodiments, the cellulosic biomass is a fiber material, and in still further embodiments, a cellulose fiber material. In still other embodiments, fiber powder wad 50 may be formed of other biodegradable fiber materials.

In further embodiments, the fiber powder wad 50 is formed of a cellulosic fiber material comprising 40% or more by weight of a cellulosic fiber, a first wax, and a second wax. In other embodiments, the fiber powder wad 50 is formed of a cellulosic fiber material comprising 94% or more by weight of a cellulosic fiber and from 1% to 6% of a first wax, before being treated with a second wax. In those embodiments, once being treated with the second wax, the fiber powder wad 50 includes about 40% or more by weight of cellulosic fiber, and about 40% to 60% by weight of a second wax. In some embodiments, at least one of the first wax and the second wax is substantially evenly distributed throughout the volume of the cellulosic fiber. In embodiments, each of the first wax and the second wax is substantially distributed throughout the volume of the cellulosic fiber of the fiber powder wad.

In embodiments, the first wax comprises paraffin. In other embodiments, the first wax comprises a biodegradable wax. In embodiments, the second wax comprises a biodegradable wax. In certain embodiments, the second wax comprises soy wax. In certain embodiments, the second wax has a melting point of at least 140° F. In some embodiments, the second wax comprises hydrogenated soybean oil or partially hydrogenated soybean oil.

In certain embodiments, the fiber powder wad may only comprise cellulose fibers and a second wax, and the first wax is omitted. In those embodiments, once being treated with the second wax, the fiber powder wad 50 includes about 40% or more by weight of cellulosic fiber, and about 40% to 60% by weight of a second wax.

In certain embodiments, the fiber powder wad is dimensioned to operate effectively for a predetermined size of the cartridge 20 and shot pellet 38. In embodiments, the cartridge 20 is 12-gauge cartridge, and the fiber powder wad has the following dimensions. The annular depression 54 has an axial depth 70 of about 0.05-0.1 inches, an inner diameter 72 of about 0.40-0.55 inches at the axial end 56 or 66, and an outer diameter 74 of about 0.55-0.65 inches at the axial end 56 or 66; in particular embodiments the axial depth 70 is about 0.08 inches, the inner diameter 72 is about 0.47 inches and the outer diameter 74 is about 0.60 inches. In some embodiments, the fiber powder wad has an outer diameter 76 to conform to the inner diameter 30 of the casing 22, in embodiments the outer diameter 76 is about 0.732 inches. The ring 52 of the fiber wad 50 defines a width 78 in the radial direction of about 0.03-0.10 inches from the outer diameter 74 of the annular depression 54 to the radially outer surface 58 of the fiber powder wad; in certain embodiments the width 78 is about 0.06-0.07 inches. The fiber powder wad 50 defines an axial length 80 that in embodiments is about 0.25-0.55 inches, about 0.30-0.50 inches, about 0.40 inches, about 0.390-0.420 inches, about 0.404 inches, and about 0.41 inches.

As noted above, after firing the firearm, the ring 52 obturates and forms a gas seal with the gun barrel. The engineered material of cellulosic fibers impregnated with two waxes provides the necessary strength and ductility to first form the ring 52 during the manufacturing process, and then obturate with more consistency and higher chamber pressure than the constituent materials alone. In certain embodiments of a 12-gauge cartridge, the ring 52 of the fiber powder wad 50 obturates and seals to provide a chamber pressure of at least 9,000 psi, and in certain other embodiments provides a chamber pressure of at least 10,000 psi, as discussed further below with reference to FIGS. 4-6. At the same time, the fiber powder wad 50 and ring 52 provide sufficient brittleness such that the ring breaks from the fiber powder wad before exiting the barrel. Such dislocation of the ring 52 may aid in obturation and sealing during the firing process. Upon exiting the barrel, the fiber powder wad 50 is configured to travel further than the shot wad 90.

Shot Wad

Referring again to FIGS. 1-3, in certain embodiments, the shot wad 90 is positioned in the casing 22 forward of the fiber powder wad 50. The shot wad 90 has a rearward portion 100, a forward portion 102 comprising a forward rim 104, and in some embodiments, at least one axially-extending slit 106 extending rearwardly from the forward rim 104. In some embodiments, shot wad 90 includes two axially extending slits 106, and in some embodiments three, four or more axially extending slits 106. The shot wad 90 defines an inner diameter 108 and an axial length 110. The shot wad 90 contains shot 38; in embodiments the shot substantially fills the volume of the shot wad located between the spacer 92 and the forward rim 104. In other embodiments, the shot substantially fills the volume of the shot wad from the forward rim all the way to the fiber powder wad 50, and there is no spacer.

In certain embodiments, the axial slits 106 of the shot wad allow for controlling separation of the shot wad 90 from shot 38 during firing. In embodiments with two axial slits 106 at diametrically opposed ends of the shot wad 90, when fired, the shot wad 90 tube will segment into two equal halves and prevent the shot wad 90 from interfering with shot dispersion. The slit 106 extends for a portion of the axial length 110 of the shot wad 90 and leaving attached material beyond the slit, and in embodiments, the slit 106 is at least 33% of the axial length of the attached material, and in other embodiments the slit is about 100%, 150%, 200%, 300%, 400%, 500%, 600%, 700%, 800%, 900%, 1000%, or 1100% of the axial length of the remaining attached material. In embodiments, the slit 106 terminates at a length of at least 25% of the axial length 110 of the shot wad 90, and in other embodiments the slit terminates at 50%, 60%, 70%, 75%, 80%, 90%, 95%, 98% of the axial length 110, or ranges in between these values. In certain embodiments, upon exiting the barrel, the shot wad 90 opens, flares, or petals along the axial slits 106, which slows the speed of the shot wad 90 relative to the shot 38, allowing the shot wad 90 to separate from the shot 38.

The shot wad 90 is formed of biodegradable materials in some embodiments. In embodiments, the shot wad 90 is formed of cellulosic fiber such as paperboard or cardboard. In certain embodiments, the shot wad 90 does not include wax or plastic.

In embodiments for a cartridge 20 that is 12 gauge, the axial length 110 of the shot wad 90 is about 0.8-1.4 inches, in some embodiments about 1.0-1.2 inches, and in certain embodiments about 1.1 inches. In other embodiments, the shot wad 90 has an axial length 110 of about 2.5-3.5 inches; in certain embodiments the axial length 110 is about 2.75 inches or 3.0 inches to accommodate different types and sizes of shot 38. It will be appreciated that the corresponding axial lengths of the fiber powder wad 50 and the spacer 92 may vary with the shot wad in some embodiments, and in other embodiments these component lengths may remain substantially the same for a given firearm gauge.

Spacer

Referring to FIG. 3, the spacer 92 is positioned in the shot wad 90 rearward portion 100 and forward of the fiber powder wad 50. In embodiments, the spacer 92 comprises cellulosic biomass such as corn byproduct or corn cob or corn cob byproduct. In certain embodiments, the corn cob byproduct includes ground corn cob. In certain embodiments, the spacer 92 is formed of corn cob has a specific gravity of 673 kg/m$^3$ and particles of a grit or dust size. In some embodiments, the corn cob is sourced under the trade name Corncob Particles and manufactured by Green Products Company of Conrad, Iowa, USA. In certain embodiments, the spacer 92 consists essentially of corn byproduct, in other embodiments the spacer comprises corn byproduct and additional material that may be biodegradable. The spacer 92 may be a unitary piece of corn byproduct bonded together or may be loose granulated material.

In certain embodiments, when contained within the shot wad 90, the spacer 92 is generally cylindrical with an axial length 120 and a diameter 122 sized to fit within the inner diameter 108 of the shot wad. In embodiments, the axial length 120 of the spacer 92 is about 0.2-0.6 inches, 0.3-0.5 inches, 0.35-0.45 inches, about 0.4 inches, and about 0.42 inches.

In some embodiments, the spacer 92 occupies space within the shot wad 90 that is not taken up by shot 38, and allowing the shot 38 to be packed to the forward end 102 and/or forward rim 104 of shot wad 90, such that the casing 22 can be crimped at crimp 29 and closed over forward rim 104 and securely maintain shot 38 within the casing 22 before use.

Accordingly, in embodiments of the present disclosure, the axial length 110 of the shot wad 90, the axial length 120 of the spacer, and the axial length 80 of the fiber powder wad 50 can be defined in relative terms. In embodiments, the spacer axial length 120 is about 30-50% of the shot wad axial length 110 and the fiber powder wad axial length 80 is about 30-50% of the shot wad axial length 110. In embodiments, the axial length 80 of the fiber powder wad 50 is less than the axial length 120 of the spacer 92. In embodiments, the fiber powder wad axial length 80 is about 90-110% of the spacer axial length 120; in some embodiments the fiber powder wad axial length 80 is about 90-110% of the spacer axial length 120. In embodiments, the shot wad axial length 110 is about 35-65% of the axial length 40 of the casing 22.

Method of Forming Powder Wad

The present disclosure includes a method of manufacturing the powder wad 50. The method in various embodiments may include some or all of the below steps, in any order. Accordingly, the disclosed method is not intended to limit the structure of the fiber powder wad 50 in product claims.

In some embodiments, the method comprises bonding cellulosic fibers to form a board. The bonding step includes emulsifying a first wax and water to form a wax emulsion, separating the first wax from the wax emulsion by adding aluminum sulfate to the wax emulsion, and depositing the first wax onto cellulosic fibers. In embodiments, the first wax comprises a paraffin wax, in other embodiments the first wax may be biodegradable. The cellulosic fibers with deposited first wax are then formed into a board shape with a thickness greater than the axial length 80 of the fiber powder wad. In embodiments, the forming step includes forming a slurry with the wax emulsion and the cellulosic fibers, and pressing the slurry into a board. The board is dried and, during the drying stage, the first wax is melted and substantially uniformly distributed throughout the board. In embodiments, upon drying the board, the board comprises at least 94% cellulose by weight, at least 1%, and in some embodiments, 1% to 6% of the first wax by weight, and exhibits a density of at least 25 lb./ft with a surface tensile strength of between 450 psi to 700 psi. In some embodiments, the second wax described herein may be substituted for the first wax, and only one step is needed to apply the second wax.

In some embodiments, when the board is dried, a cylindrical puck is cut (e.g., punched) from the board and sized at substantially the outer diameter 76 of the fiber powder wad. The puck is placed in a partially-open container such as a basket. In embodiments, a plurality of pucks are cut and placed into a basket. At this stage, the puck is susceptible to moisture and highly absorbent. In the alternative, the pucks can be formed directly from the slurry instead of first being formed into a board.

In certain embodiments, the puck is soaked in a second wax. In some embodiments, the second wax is biodegradable. In other embodiments, the second wax includes soy wax. In certain embodiments, the second wax has a melting point of at least 130° F., at least 140° F., or at least 150° F. In some embodiments, the second wax is a biodegradable soy wax having one or more of the following properties: a melting point of about 150° F., acid value (USP 401)<2.0 mg KOH/g, peroxide value (USP 401) of about 0.51 MEQ/kg, and iodine value (USP 401) of about 2.3 g/100 g. In certain embodiments, the second wax is the product Soy Wax #350° F. manufactured by Koster Keunen, Inc. of Watertown, Connecticut, USA.

In some embodiments, the second wax is heated in a tank to a set point temperature. In embodiments the set point temperature is in a range of about 175-225° F. and the second wax comprises a soy wax having a melting point of at least 150° F. Generally, the set point temperature is at least 10 degrees above the melting point of the second wax. In some embodiments, the container holding the puck(s) is covered (e.g., with a lid) and dipped in the tank for a dipping time period. In embodiments, the dipping time period is about 30-90 seconds, at least 30 seconds, at most 90 seconds, about 40-60 seconds, about 40 seconds, about 50 seconds, or about 60 seconds. The dipping step applies the second wax to the puck while maintaining the second wax at the set point temperature, whereby the second wax is at least partially absorbed through the volume of the puck. In embodiments, the second wax is absorbed through at least 50%, at least 70%, at least 90%, or absorbed through substantially the entire volume of each puck. In embodiments, upon heating the second wax in the tank to the set point temperature, the soy wax has a viscosity of approximately water, or within approximately 10% of water. In embodiments, the second wax comprises hydrogenated or partially hydrogenated soybean oil. In embodiments, the second wax has a melting point of 142-155° F. In certain embodiments, the tank is not pressurized above ambient pressure, in other embodiments, the tank is pressurized above ambient pressure. Other methods of absorbing the second wax into the puck may be used, however, in certain embodiments, the wax should penetrate the surface of the puck and be substantially absorbed by the puck. In other embodiments the second wax is not applied as a surface coating, or as a coating that stays within 5% or within 10% of the surface of the puck, but instead is absorbed by the puck.

In some embodiments, subsequently, the container with one or more pucks is removed from the tank and the pucks are cooled for a cooling time period. The second wax is solidified after the cooling time period. In embodiments, the cooling time period is about 12-24 hours; in other embodiments the cooling time period is about 2 hours or less while applying cooled temperatures (e.g., refrigeration). In certain embodiments, once dry, the second wax creates a moisture barrier around the puck. In other embodiments, the puck including the second wax absorbs less water relative to a puck without the second wax. In still further embodiments, the puck including the second wax is substantially waterproof. In other embodiments, a puck with the second wax has increased ductility compared to a puck without the second wax, allowing subsequent forming processes (e.g., pressing an annular depression 52, 62) where the puck will take a shape without breaking.

In certain embodiments, after applying the second wax, the cellulosic fibers comprise at least 30%, at least 35%, at least 40%, at least 45%, at least 50%, at least 55%, at least 60%, at least 65%, or any range between those values, by weight of the powder wad. In further embodiments, after applying the second wax, the second wax comprises at least 70%, at least 65%, at least 60%, at least 55%, at least 50%, at least 45%, at least 40%, at least 35%, or any range between those values, by weight of the powder wad. In further embodiments, after applying the second wax, the first wax comprises less than 6%, less than 5%, less than 4%, less than 3%, less than 2%, less than 1%, less than 0.5%, or any range between those values, by weight of the powder wad. In certain embodiments, the powder wad includes about 40% cellulosic fibers by weight, about 1% or less of paraffin wax by weight, and about 60% soy wax by weight. In certain embodiments, the powder wad includes about 35% to 45% cellulosic fibers by weight, about 0.1% to 2% paraffin wax by weight, and about 65% to 55% soy wax by weight.

In some embodiments, the cooled pucks are pressed between a pair of opposed presses acting against both axial ends of the puck. In certain embodiments, the pucks are pressed in a barrel die. The presses form the annular depressions 54, 64 at both axial ends, whereby the ring 52, 62 is formed radially outwardly from the annular depression. The pair of opposed presses encapsulate the puck to prevent radial expansion of the puck. The puck may be fed into a die prior to pressing. In certain embodiments, some shearing of the puck material occurs while forming the annular depressions 54, 64 and rings 52, 62. In embodiments, the pressing is performed at 750-4000 psi.

It will be appreciated that the methods of manufacturing applicable to the present disclosure may be modified from the above embodiment. In some embodiments, the steps of bonding cellulosic fiber and forming a board may omit wax, only coat with the first wax, or use alternatives to the first wax. In some embodiments, the dipping step is a first and only application of wax.

Performance of Fiber Powder Wad

Figure 4:
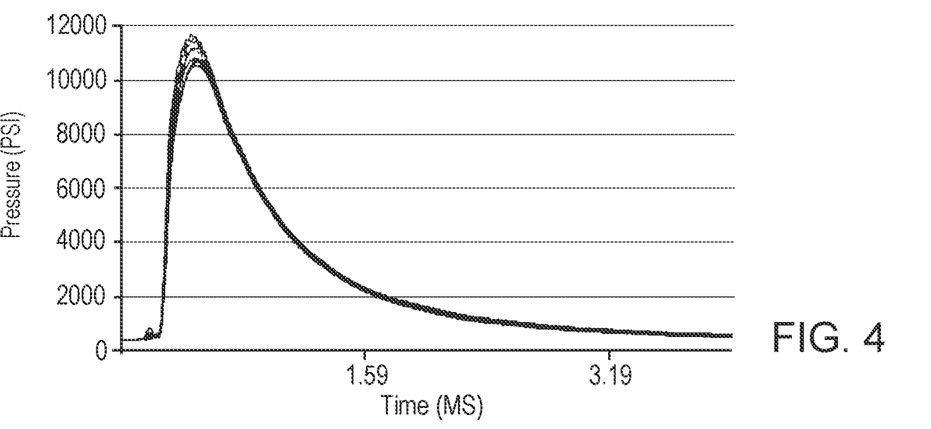
FIG. 4 is a graph of chamber pressure over time for a series of tests on example cartridges with a fiber powder wad that is both waxed and formed according to embodiments of the present disclosure.
Figure 5:
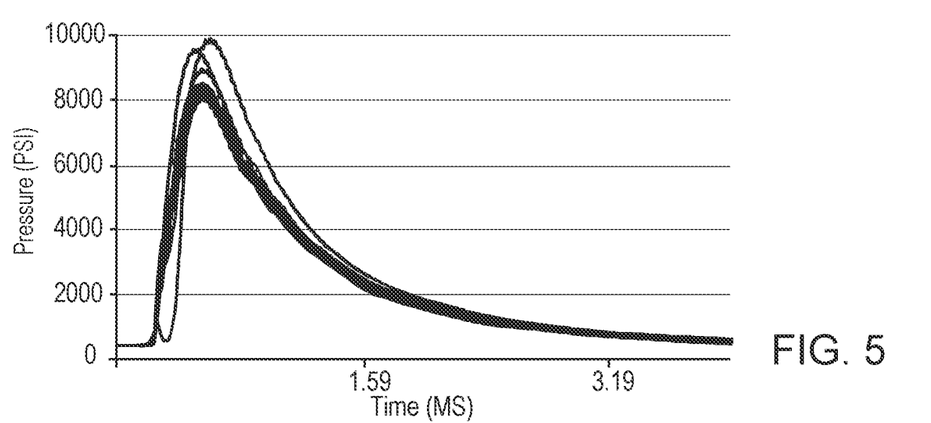
FIG. 5 is a graph of chamber pressure over time for a series of tests on example cartridges with a fiber powder wad that is waxed but not formed according to embodiments of the present disclosure.
Figure 6:
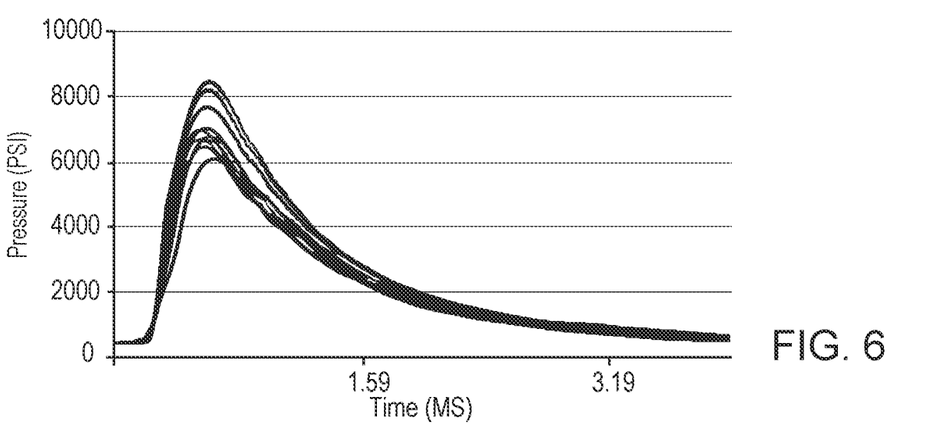
FIG. 6 is a graph of chamber pressure over time for a series of tests on example cartridges with a fiber powder wad that is neither waxed nor formed according to embodiments of the present disclosure.

Referring to FIGS. 4-6, testing performance is graphed for ten samples each of three different embodiments of the fiber powder wad 50. It is desirable to make a shotshell with biodegradeable, renewably sourced, and/or environmentally safe components, particularly the wads and shot, which often end up discarded in the environment. However, such a shotshell must also have performance comparable current shotshell design using non-biodegradable materials. Using stock biodegradable materials, particularly for the powder wad, result in a reduction in performance, particularly chamber pressure and shot muzzle velocity. The failure of the wad to build sufficient chamber pressure can be heard audibly upon firing, and can sometimes result in muzzle flash as unburnt powder burns after exiting the muzzle. The current invention relates to a biodegradable powder wad 50 that has ballistic and ergonomic performance comparable to standard shotshells. In some embodiments, the current invention includes other biodegradable components such as the shot wad 90 and spacer 92.

FIG. 4 shows performance of a fiber powder wad 50 including both the first wax, second wax and the ring 52, with statistical information reflected in Table 1 below. FIG. 5 shows performance of a fiber powder wad 50 including the first wax and second wax but without the formed ring 52, with statistical information reflected in Table 2 below. FIG. 6 shows performance of a fiber powder wad 50 without either of the second wax and the ring 52 (but still including the first wax), with statistical information reflected in Table 1 below. During testing, all samples were loaded with the same propellant weight, shot, corncob and pouch.

TABLE 1

Summary of Test Data for FIG. 4 (Waxed and Formed)

|  | Velocity (fps) | Chamber Pressure (psi) |
|---|---|---|
| Avg. | 1,192 | 11,035 |
| Std. Dev. | 7 | 383 |
| Max | 1,203 | 11,726 |
| Min | 1,177 | 12,185 |
| Range | 1,170 | 9,885 |

TABLE 2

Summary of Test Data for FIG. 5 (Waxed, Not Formed)

|  | Velocity (fps) | Chamber Pressure (psi) |
|---|---|---|
| Avg. | 1,103 | 8,613 |
| Std. Dev. | 33 | 615 |
| Max | 1,159 | 9,862 |
| Min | 1,068 | 8,052 |
| Range | 91 | 1,810 |

TABLE 3

Summary of Test Data for FIG. 6 (Not Waxed, Not Formed)

|  | Velocity (fps) | Chamber Pressure (psi) |
|---|---|---|
| Avg. | 1,071 | 7,103 |
| Std. Dev. | 69 | 769 |
| Max | 1,177 | 8,459 |
| Min | 1,007 | 6,076 |
| Range | 170 | 2,383 |

As shown in FIGS. 4-6 and Tables 1-3, the formed and waxed powder wad (FIG. 4) had the highest chamber pressure and muzzle velocity of the three sample runs, which indicates it had the most complete and efficient sealing and burn of propellant. The formed and waxed powder wad also had the lowest range and standard deviation in both pressure and velocity, which indicates that the gas seal is consistent and repeatable. Moreover, the formed and wax wad provided sound and muzzle flash that were closely comparable to conventional shotshell components.

Various modifications, omissions, and additions to the above examples are contemplated to be within the scope of the present disclosure. In certain embodiments, the spacer may be omitted. And over-shot wad may be provided and in embodiments may be formed of a biodegradable material. Certain embodiments of an over-shot wad may be formed of a same biodegradable material as one or more of the fiber powder wad, spacer, shot wad, and/or casing. Certain embodiments herein are specifically addressed to cartridges for a 12-gauge shotgun. In embodiments, shot pellets may be lead-free, lead, a lead alloy, or may be replaced by other load(s) or non-lethal projectile(s). The forward end of the casing may include an over-shot wad and may be closed or partially closed by various structures such as a crimp. The present disclosure may also be applicable to various types of firearms and styles of shotgun.

All of the features disclosed, claimed, and incorporated by reference herein, and all of the steps of any method or process so disclosed, may be combined in any combination, except combinations where at least some of such features and/or steps are mutually exclusive. Each feature disclosed in this specification may be replaced by alternative features serving the same, equivalent or similar purpose, unless expressly stated otherwise. Thus, unless expressly stated otherwise, each feature disclosed is an example only of a generic series of equivalent or similar features. Inventive aspects of this disclosure are not restricted to the details of the foregoing embodiments, but rather extend to any novel embodiment, or any novel combination of embodiments, of the features presented in this disclosure, and to any novel embodiment, or any novel combination of embodiments, of the steps of any method or process so disclosed.

Although specific examples have been illustrated and described herein, it will be appreciated by those of ordinary skill in the art that any arrangement calculated to achieve the same purpose could be substituted for the specific examples disclosed. This application is intended to cover adaptations or variations of the present subject matter. Therefore, it is intended that the invention be defined by the attached claims and their legal equivalents, as well as the illustrative aspects. The above described embodiments are merely descriptive of its principles and are not to be considered limiting. Further modifications of the invention herein disclosed will occur to those skilled in the respective arts and all such modifications are deemed to be within the scope of the inventive aspects.

What is claimed is:

1. A shotgun shell cartridge comprising:
a casing comprising a primer;
a shot wad positioned in the casing;
a biodegradable fiber powder wad inside the casing and rearward of the shot wad, comprising:
at least 40% cellulosic fiber by weight,
a wax distributed through the cellulosic fiber,
a rearward-facing axial end comprising, comprising:
an annular depression, and
a ring located radially outward from the annular depression; and
a propellant housed in the casing, rearward of the biodegradable fiber powder wad.

2. The shotgun shell cartridge of claim 1, wherein the wax is evenly distributed through the cellulosic fiber, the wax comprising a first wax and a second wax, the first wax and second wax being comprised of different materials.

3. The shotgun shell cartridge of claim 2, wherein the first wax and the second wax are each comprised of a material selected from: paraffin, soy, and hydrogenated soybean oil.

4. The shotgun shell cartridge of claim 1, further comprising a spacer comprising corn byproduct, wherein the spacer is located rearward of the shot wad and forward of the biodegradable fiber powder wad.

5. The shotgun shell cartridge of claim 1, further comprising an opposite a forward-facing axial end of the biodegradable fiber powder wad comprising:
a second annular depression, and
a second ring located radially outward from the second annular depression.

6. A shotgun shell cartridge comprising:
a casing comprising a primer;
a shot wad positioned in the casing;
a biodegradable fiber powder wad inside the casing and rearward of the shot wad, comprising:
 a cellulosic fiber,
 a wax distributed through the cellulosic fiber,
 a rearward-facing axial end comprising,
  an annular depression, and
   a ring located radially outward from the annular depression; and
a propellant housed in the casing, rearward of the biodegradable fiber powder wad.

7. The shotgun shell cartridge of claim 6, wherein the biodegradable fiber powder wad comprises at least 40% cellulosic fiber by weight, the wax being evenly distributed through the cellulosic fiber, the wax comprising a first wax and a second wax, the first wax and second wax being comprised of different materials.

8. The shotgun shell cartridge of claim 7, wherein the first wax and the second wax are each comprised of a material selected from: paraffin, soy, and hydrogenated soybean oil.

9. The shotgun shell cartridge of claim 6, further comprising a spacer comprising corn byproduct, wherein the spacer is located rearward of the shot wad and forward of the biodegradable fiber powder wad.

10. The shotgun shell cartridge of claim 6, further comprising forward-facing axial end of the biodegradable fiber powder wad comprising:
a second annular depression, and
a second ring located radially outward from the second annular depression.

11. A method of manufacturing a wad for shotshell, comprising:
bonding cellulosic fibers to form a board, the bonding comprising:
 depositing a wax onto the cellulosic fibers; and
 forming the board from the cellulosic fibers and the wax, and wax;
cutting a cylindrical puck from the board;
cooling the cylindrical puck; and
pressing at least one press against at least one axial end of the cylindrical puck to form an annular depression at the at least one axial end, whereby a ring is formed radially outwardly from the annular depression.

12. The method of claim 11, further comprising emulsifying the wax and water to form a wax emulsion prior to depositing the wax onto the cellulosic fibers.

13. The method of claim 12, further comprising separating the wax from the wax emulsion by adding aluminum sulfate to the wax emulsion prior to depositing the wax onto the cellulosic fibers.

14. The method of claim 11, further comprising drying the board prior to cutting the cylindrical puck from the board.

15. The method of claim 11, further comprising dipping the cylindrical puck into a second wax prior to the cooling of the puck.

16. The method of claim 15, wherein the second wax is absorbed through at least 90% of a volume of the puck.

17. The method of claim 15, further comprises placing the cylindrical puck in a container and dipping the container in a tank for a dipping time period of at least 30 seconds to apply the second wax to the puck while maintaining the second wax at a set point temperature.

18. The method of claim 17, wherein the set point temperature is configured to be at least 10 degrees Fahrenheit above a melting point of the second wax.

19. The method of claim 17, wherein the tank is not pressurized above ambient pressure.

20. The method of claim 11, wherein forming comprises forming a slurry with the wax and the cellulosic fibers and pressing the slurry into the board.

* * * * *